(12) United States Patent
Utter et al.

(10) Patent No.: US 10,695,861 B2
(45) Date of Patent: Jun. 30, 2020

(54) FRICTION STIR EXTRUSION OF NONWELDABLE MATERIALS FOR DOWNHOLE TOOLS

(71) Applicant: Mazak Corporation, Florence, KY (US)

(72) Inventors: Robert J. Utter, Sugar Land, TX (US); Rodney Dale Fleck, Draper, UT (US); Russell J. Steel, Salem, UT (US)

(73) Assignee: Mazak Corporation, Florence, KY (US)

( * ) Notice: Subject to any disclaimer, the term of this patent is extended or adjusted under 35 U.S.C. 154(b) by 483 days.

(21) Appl. No.: 15/324,866

(22) PCT Filed: Jul. 9, 2015

(86) PCT No.: PCT/US2015/039787
§ 371 (c)(1),
(2) Date: Jan. 9, 2017

(87) PCT Pub. No.: WO2016/007773
PCT Pub. Date: Jan. 14, 2016

(65) Prior Publication Data
US 2017/0216961 A1    Aug. 3, 2017

Related U.S. Application Data

(60) Provisional application No. 62/084,432, filed on Nov. 25, 2014, provisional application No. 62/023,166, filed on Jul. 10, 2014.

(51) Int. Cl.
*B23K 20/12* (2006.01)
*F16B 5/08* (2006.01)
(Continued)

(52) U.S. Cl.
CPC .......... *B23K 20/127* (2013.01); *B21K 25/005* (2013.01); *E21B 17/1078* (2013.01);
(Continued)

(58) Field of Classification Search
CPC . B23K 20/127; B23K 20/129; E21B 17/1078; E21B 17/1085; F16B 5/08
See application file for complete search history.

(56) References Cited

U.S. PATENT DOCUMENTS 3,660,889 A    5/1972   Groom
4,156,374 A    5/1979   Shwayder
(Continued)

FOREIGN PATENT DOCUMENTS

| CN | 102120287 | 7/2011 |
|---|---|---|
| JP | 2009022974 | 2/2009 |

OTHER PUBLICATIONS

U.S. Appl. No. 62/023,166, filed Jul. 10, 2014, Steel.
(Continued)

*Primary Examiner* — Jonathan P Masinick
(74) *Attorney, Agent, or Firm* — Fitch, Even, Tabin & Flannery LLP

(57) ABSTRACT

A non-weldable workpiece may be affixed to a weldable workpiece by friction stirring the weldable workpiece to plasticize and extrude at least a portion thereof into a recess in the non-weldable workpiece. The weldable workpiece may then be welded to a body of a downhole tool to enable the welding of a non-weldable workpiece onto a body to increase the wear-resistance of the body.

20 Claims, 8 Drawing Sheets

(51) Int. Cl.
  *E21B 17/10* (2006.01)
  *B21K 25/00* (2006.01)
  *B23K 101/04* (2006.01)
  *B23K 101/20* (2006.01)
  *B23K 103/04* (2006.01)
  *B23K 103/10* (2006.01)
  *B23K 103/14* (2006.01)
  *B23K 103/20* (2006.01)
  *B23K 103/18* (2006.01)
  *B23K 101/00* (2006.01)

(52) U.S. Cl.
  CPC ............ *E21B 17/1085* (2013.01); *F16B 5/08* (2013.01); *B23K 2101/002* (2018.08); *B23K 2101/04* (2018.08); *B23K 2101/20* (2018.08); *B23K 2103/04* (2018.08); *B23K 2103/10* (2018.08); *B23K 2103/14* (2018.08); *B23K 2103/20* (2018.08); *B23K 2103/26* (2018.08)

(56) References Cited

U.S. PATENT DOCUMENTS

| | | | |
|---|---|---|---|
| 5,806,615 A * | 9/1998 | Appleton | F16L 3/1091 175/325.7 |
| 6,648,206 B2 | 11/2003 | Nelson | |
| 6,732,901 B2 | 5/2004 | Nelson | |
| 6,779,704 B2 | 8/2004 | Nelson | |
| 7,124,929 B2 | 10/2006 | Nelson | |
| 7,152,776 B2 | 12/2006 | Nelson | |
| 7,156,171 B2 * | 1/2007 | Gremillion | E21B 17/1028 166/241.1 |
| 7,225,968 B2 | 6/2007 | Packer | |
| 7,270,257 B2 | 9/2007 | Steel | |
| 7,494,040 B2 | 2/2009 | Babb | |
| 7,530,486 B2 | 5/2009 | Flak | |
| 7,608,296 B2 | 10/2009 | Packer | |
| 7,651,018 B2 | 1/2010 | Packer | |
| 7,661,572 B2 | 2/2010 | Nelson | |
| 7,753,252 B2 | 7/2010 | Taylor | |
| 7,845,545 B2 | 12/2010 | Packer | |
| 7,909,231 B2 | 3/2011 | Babb | |
| 7,992,759 B2 | 8/2011 | Steel | |
| 7,993,575 B2 | 8/2011 | Nelson | |
| 8,056,797 B2 | 11/2011 | Packer | |
| 8,157,154 B2 | 4/2012 | Packer | |
| 8,186,561 B2 | 5/2012 | Allen | |
| 8,241,556 B2 | 8/2012 | Rosal | |
| 8,302,834 B2 | 11/2012 | Nelson | |
| 8,317,080 B2 | 11/2012 | Kingston | |
| 8,469,256 B2 | 6/2013 | Babb | |
| 8,490,855 B2 | 7/2013 | Kingston | |
| 8,550,326 B2 | 10/2013 | Packer | |
| 8,910,851 B2 | 12/2014 | Rosal | |
| 8,955,734 B2 | 2/2015 | Steel | |
| 9,061,370 B2 | 6/2015 | Nelson | |
| 9,061,371 B2 | 6/2015 | Higgins | |
| 9,242,308 B2 | 1/2016 | Peterson | |
| 9,352,425 B2 | 5/2016 | Rosal | |
| 9,764,375 B2 | 9/2017 | Miles | |
| 2002/0162620 A1 | 11/2002 | Liaw | |
| 2003/0075584 A1 | 4/2003 | Sarik | |
| 2004/0057782 A1 * | 3/2004 | Okamoto | B21K 25/005 403/271 |
| 2004/0149807 A1 * | 8/2004 | Schilling | B21K 25/005 228/112.1 |
| 2005/0006439 A1 | 1/2005 | Packer | |
| 2005/0051602 A1 | 3/2005 | Babb | |
| 2005/0142005 A1 | 6/2005 | Traylor | |
| 2006/0032333 A1 | 2/2006 | Steel | |
| 2006/0032891 A1 | 2/2006 | Flak et al. | |
| 2006/0049234 A1 | 3/2006 | Flak | |
| 2006/0157531 A1 | 7/2006 | Packer | |
| 2006/0175382 A1 | 8/2006 | Packer | |
| 2007/0187465 A1 | 8/2007 | Eyre | |
| 2008/0029578 A1 | 2/2008 | Steel | |
| 2008/0206116 A1 | 8/2008 | Satou et al. | |
| 2009/0294514 A1 | 12/2009 | Babb | |
| 2010/0071961 A1 | 3/2010 | Steel | |
| 2010/0078224 A1 | 4/2010 | Steel | |
| 2010/0167083 A1 * | 7/2010 | Park | B23K 20/1225 428/615 |
| 2011/0127311 A1 | 6/2011 | Peterson | |
| 2011/0172802 A1 | 7/2011 | Babb | |
| 2012/0055977 A1 | 3/2012 | Steel | |
| 2012/0227546 A1 | 9/2012 | Allen | |
| 2012/0273555 A1 | 11/2012 | Flak | |
| 2013/0062395 A1 | 3/2013 | Nelson | |
| 2013/0206818 A1 | 8/2013 | Higgins | |
| 2013/0228612 A1 | 9/2013 | Higgins | |
| 2013/0299561 A1 | 11/2013 | Higgins | |
| 2014/0008418 A1 | 1/2014 | Steel | |
| 2014/0034215 A1 | 2/2014 | Khan | |
| 2014/0151438 A1 | 6/2014 | Fleck | |
| 2015/0258628 A1 | 9/2015 | Flak | |
| 2017/0197274 A1 | 7/2017 | Steel | |
| 2018/0073532 A1 * | 3/2018 | Whalen | B23K 20/1265 |
| 2018/0099349 A1 | 4/2018 | Packer | |
| 2019/0061046 A1 | 2/2019 | Fleck | |
| 2019/0061048 A1 | 2/2019 | Fleck | |
| 2019/0151982 A1 | 5/2019 | Rosal | |

OTHER PUBLICATIONS

U.S. Appl. No. 62/084,432, filed Nov. 25, 2014, Utter.
International Search Report and Written Opinion for PCT/US2015/039785, dated Nov. 11, 2015.
International Search Report and Written Opinion for PCT/US2015/039787, dated Nov. 24, 2015.
U.S. Appl. No. 11/821,790, filed Jun. 25, 2007, Packer Scott M.
U.S. Appl. No. 12/392,030, filed Feb. 24, 2009, Babb Jonathan A.
U.S. Appl. No. 16/401,907, filed May 2, 2019, Liu Qingyuan.
U.S. Appl. No. 16/407,353, filed May 9, 2019, Miles Michael P.
U.S. Appl. No. 60/573,703, filed May 24, 2014, 6 pages.

* cited by examiner

FRICTION STIR EXTRUSION OF NONWELDABLE MATERIALS FOR DOWNHOLE TOOLS

CROSS-REFERENCE TO RELATED APPLICATIONS

This application is a U.S. Nationalization of PCT Application Number PCT/US2015/039787, filed on Jul. 9, 2015, which claims priority to and the benefit of U.S. Provisional Patent Application No. 62/084,432, filed Nov. 25, 2014. The PCT Application Number PCT/US2015/039787, filed on Jul. 9, 2015, also claims priority to and the benefit of U.S. Provisional Patent Application No. 62/023,166, filed Jul. 10, 2014, the disclosures of which are incorporated herein by reference in their entireties.

BACKGROUND OF THE DISCLOSURE

Friction stir welding ("FSW") of metals has been used to attach weldable materials to one another in a solid state joining process. FSW uses the motion of a pin pressed against the surface of a weldable material to generate heat and friction to move the weldable material. The material may plasticize and physically stir together with a second material to which the first material may be welded. For example, a pair of metal plates may be positioned adjacent one another with their respective edges abutting one another forming a seam between the two plates. A pin, a pin and shoulder, or other "FSW tip" may be rotated in contact with the two plates. A force may be applied to the FSW tip to urge the FSW tip against the two plates. The FSW tip may be moved along the seam to stir the edges of the two plates together. The physical process of mixing material from the plates may join the plates. FSW of metals may include friction stir joining ("FSJ"), friction stir extrusion ("FSE"), and other techniques including the plasticization of weldable material without a liquid state. In another example, two weldable materials may be stacked relative to one another and to an FSW tip, and the FSW tip may be rotated and plunged into the stack of the two materials to stir material from the top plate and bottom plate together and bond the two weldable materials together.

FSW may join weldable materials in a solid-state process that avoids many of the potential defects of other welding processes. For example, FSW may produce a bond region along the path of the tool that is generally indistinguishable from the original material. FSW may be performed without the inclusion of an additional material or use of shield gasses. Some welding methods, such as metal-inert gas ("MIG") welding, may introduce an additional material to create a bond. Other welding methods, such as tungsten-inert gas ("TIG") welding, may use a non-consumable contact point to heat one or more workpieces. However, the heating may cause the one or more workpieces to attain a liquid phase and risk a phase change in the one or more workpieces. A phase change may compromise the integrity of the bond and, potentially, the workpiece, itself. To limit the possibility of a phase change or other reaction, TIG welding and similar processes utilize an inert gas "shield" around the contact area.

FSW may, therefore, provide more controllable bonds in various applications. The predictability of FSW may be desirable during the manufacturing and/or assembly of structures or devices that experience high forces during use in environments or applications in which the structure or device may be inaccessible by operators. For example, a downhole tool may be delivered hundreds to thousands of meters through a to wellbore during a drilling application. A downhole tool may include stabilizer pads that have wear resistant material affixed thereto. The wear resistant material may be a non-weldable material such as a high temperature ceramic. Conventional welding techniques may be insufficient to affix a non-weldable material to a downhole tool.

BRIEF SUMMARY OF THE DISCLOSURE

This summary is provided to introduce a selection of concepts that are further described below in the detailed description. This summary is not intended to identify specific features of the claimed subject matter, nor is it intended to be used as an aid in limiting the scope of the claimed subject matter.

In a first non-limiting embodiment, a device includes a body and a friction stir welded "FSW" assembly welded thereto. The FSW assembly includes a non-weldable workpiece and a weldable workpiece mechanically locked together. The non-weldable workpiece has a wear surface and a connection surface on opposing sides of the non-weldable workpiece and one or more recesses located in the connection surface extending into the non-weldable workpiece. At least one of the one or more recesses has a first width proximate the connection surface and a second width within the non-weldable workpiece. The first width is smaller than the second width. A weldable workpiece has a welding surface and an extrusion surface on opposing sides of the weldable workpiece. A portion of the extrusion surface is extruded at least partially into at least one of the one or more recesses and at least a portion of the welding surface is welded to the outer surface of the body.

In another non-limiting embodiment, a method of affixed a non-weldable workpiece to a weldable workpiece includes positioning a weldable workpiece adjacent a non-weldable workpiece, applying a force to the weldable workpiece, and extruding a portion of the weldable workpiece into a recess in the non-weldable workpiece. Applying a force to the weldable workpiece includes friction stirring the weldable workpiece. The recess in the non-weldable workpiece has a first width that is smaller than a second width. The first width is closer to a surface of the non-weldable workpiece than the second width.

Additional features of embodiments of the disclosure will be set forth in the description which follows. The features of such embodiments may be realized by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
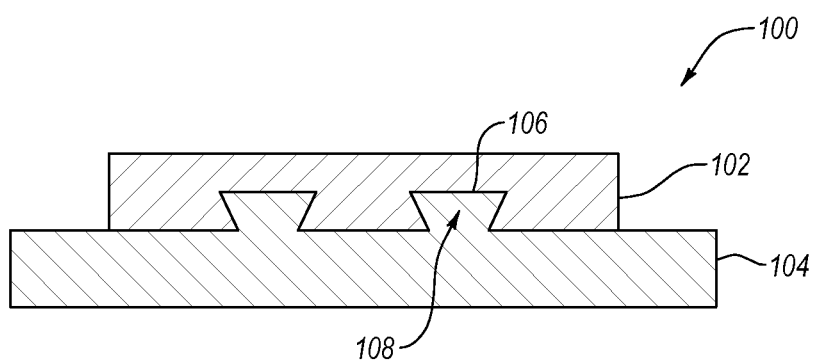
FIG. 1 is a schematic cross-sectional side view of a joint between a weldable material and a non-weldable material, in accordance with at least one embodiment described herein.

One or more specific embodiments of the present disclosure will be described below. In an effort to provide a concise description of these embodiments, some features of an actual embodiment may be described in the specification. It should be appreciated that in the development of any such actual embodiment, as in any engineering or design project, numerous embodiment-specific decisions will be made to achieve the developers' specific goals, such as compliance with system-related and business-related constraints, which may vary from one embodiment to another. It should further be appreciated that such a development effort might be complex and time consuming, but would nevertheless be a routine undertaking of design, fabrication, and manufacture for those of ordinary skill having the benefit of this disclosure.

One or more embodiments of the present disclosure may generally relate to the joining of a first material having a first strength and/or first ductility and a second material having a second strength and/or second ductility where the second strength is greater than the first strength and/or the second ductility is less than the first ductility. For example, a tool steel workpiece may be joined to a tungsten carbide workpiece. The tool steel, while having a high yield strength and low ductility, may still have a lower yield strength and greater ductility than the tungsten carbide. Tungsten carbide may be functionally non-weldable due to its high hardness and brittleness and low ductility. In another example, an aluminum alloy workpiece may be joined to a tool steel workpiece. The aluminum alloy, while having a high yield strength and low ductility compared to some materials, may still have a lower yield strength and greater ductility than the tool steel. The tool steel, while weldable by some processes including friction stir welding ("FSW"), may require specialized equipment or conditions that may render the tool steel non-weldable for a particular application.

As used herein, "non-weldable" should be understood to describe a material and/or workpiece that is non-weldable given the equipment or conditions used to weld another material. For example, a first material may be weldable by a given FSW tool capable of a certain speed of rotation, force applied normal to a workpiece, force applied lateral to a workpiece (e.g., to move the FSW tip along a path), movement speed, or other operational parameters. A second material may not be weldable by the given FSW tool, although the second material may be weldable by other equipment and/or conditions. Therefore, one should understand that the present disclosure may allow a given FSW tool to join a weldable material to a non-weldable material or, in other words, to a material which the given FSW tool may be unable to weld.

In some embodiments, a non-weldable material may include tungsten carbide, silicon carbide, alumina, cubic boron nitride, polycrystalline diamond, boron carbide, boron carbon nitride, materials having a hardness greater than 40 gigapascals (GPa) when measured by the Vicker's hardness test, or combinations thereof. In other embodiments, a non-weldable material may include steel, such as carbon steel (e.g., AISI 10XX, AISI 11XX, AISI 12XX, or AISI 15XX), manganese steel (e.g., AISI 13XX), nickel steel (e.g., AISI 23XX, or AISI 25XX), nickel-chromium steel (e.g., AISI 31XX, AISI 32XX, AISI 33XX, or AISI 34XX), molybdenum steel (e.g., AISI 40XX, or AISI 44XX), chromium-molybdenum steel (e.g., AISI 41XX), nickel-chromium-molybdenum steel (e.g., AISI 43XX, or AISI 47XX), nickel-molybdenum steel (e.g., AISI 46XX, or AISI 48XX), chromium steel (e.g., AISI 50XX, or AISI 51XX), combinations thereof, and the like, where "XX" may range from 1 to 99 and represents the carbon content; titanium alloys; nickel superalloys; other metal high melting temperature alloys.

A weldable material and/or a non-weldable material may be magnetic or non-magnetic. For example, the weldable workpiece may be a magnetic material or a non-magnetic material and the non-weldable workpiece may be a magnetic material or a non-magnetic material. In some embodiments described herein, a first workpiece made of or including a weldable material may be in contact with a second workpiece made of or including a non-weldable material. One, both, or neither of the workpieces may be magnetic. A workpiece that is magnetic may, in some embodiments, magnetize the adjacent workpiece.

FIG. 1 depicts a schematic representation of a non-weldable workpiece 102 and a weldable workpiece 104 joined by mechanically interlocking the non-weldable workpiece 102 and a weldable workpiece 104. In some embodiments, the non-weldable workpiece 102 and weldable workpiece 104 may be oriented such that the non-weldable workpiece 102 may overlay at least a portion of a surface of the weldable workpiece 104 and form a friction stir welded ("FSW") assembly 100. As described herein, FSW assembly 100 may be considered to be friction stir welded, although the material of the non-weldable workpiece 102 and weldable workpiece 104 does not combine. The non-weldable workpiece 102 may have a higher hardness than the weldable workpiece 104. The non-weldable workpiece 102 may provide a more durable and/or wear resistant surface than the weldable workpiece 104 to which the non-weldable workpiece 102 is connected. The FSW assembly 100 may be used as a wear-resistant pad in high abrasion applications.

The non-weldable workpiece 102 may be connected to the weldable workpiece 104 by a mechanical interlock. The non-weldable workpiece 102 may include one or more recesses 106 into which one of one or more extrusions 108 of the weldable workpiece 104 may be located. In some embodiments, the recess 106 and extrusion 108 may be configured to complimentarily mate with one another. In other embodiments, the recess 106 and extrusion 108 may have unequal dimensions. For example, the recess 106 and extrusion 108 may be configured to limit movement of the non-weldable workpiece 102 and weldable workpiece 104 relative to one another to a range of positions (e.g., the recess 106 and extrusion 108 may allow some movement within the range). In another example, the recess 106 and extrusion 108 may substantially prevent movement of the non-weldable workpiece 102 and the weldable workpiece 104 relative to one another.

Figure 2:
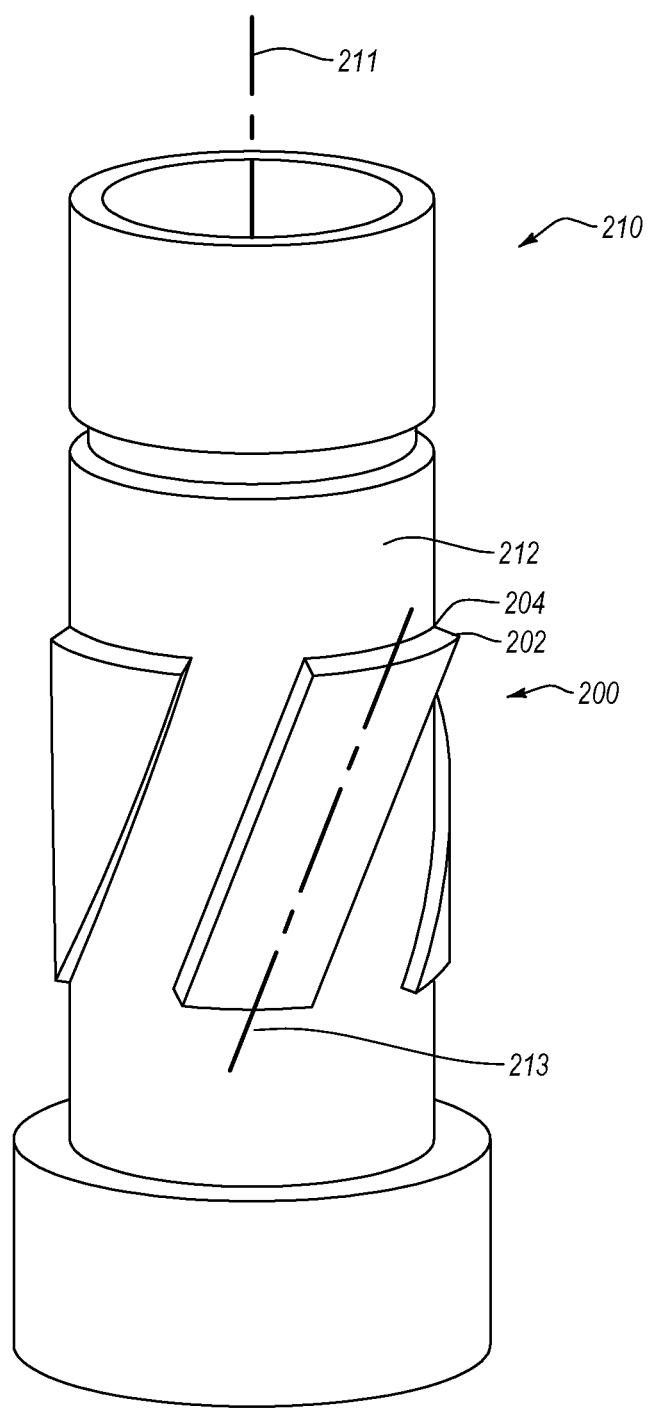
FIG. 2 is a perspective view of a downhole tool having non-weldable material affixed thereto, in accordance with at least one embodiment described herein.

The FSW assembly 100, as shown in FIG. 1, may allow the non-weldable workpiece 102 to be welded to device or structure. For example, FIG. 2 illustrates an embodiment of a downhole tool 210 for drilling applications including one or more FSW assemblies 200 having a non-weldable workpiece 202 welded thereto. The downhole tool 210 may be or be part of a drill string including one or more tubulars and a bottomhole assembly. The tubular may include a number of components such as segmented drill pipe, coiled tubing, drill collars, transition pipe (e.g., HEVI-WATE® drill pipe), drill pipe, or similar components. The tubular may transmit torque and/or longitudinal force through the primary wellbore to the bottomhole assembly. The bottomhole assembly may include a bit configured to remove material from the formation and/or to drill a lateral borehole extending from the primary wellbore. The downhole tool 210 may be used in a cased or openhole wellbore during drilling operations. The rotation of the drill string relative to the surrounding wellbore may result in abrasion or compression of parts of the downhole tool 210 as the downhole tool 210 rotates. Therefore, an FSW assembly 200 may increase the operational lifetime of a downhole tool 210.

The FSW assembly 200 may include a weldable workpiece 204 adjacent a body 212 of the downhole tool 210. The body 212 may be made of or include a material to which the weldable workpiece 204 may be connected. For example, the body 212 may be made of or include a weldable material that may be the same material as or a different material from a material in the weldable workpiece 204. The weldable workpiece 204 may, therefore, be connected to the body 212 be any appropriate method including, but not limited to, FSW, TIG welding, MIG welding, shielded metal arc welding, flux-cored arc welding, brazing, threaded pins, other connection methods, or combinations thereof.

The downhole tool 210 may have a body longitudinal axis 211 along a length of the body 212. In some embodiments, the body longitudinal axis 211 may be the rotational axis of the downhole tool 210. The FSW assembly 200 may have an assembly centerline 213. The assembly centerline 213 may be a centerline that extends through a length of the FSW assembly 200, as shown in FIG. 2. In some embodiments, the assembly centerline 213 may be at least partially defined by the orientation of the non-weldable workpiece 202. For example, an FSW assembly 200 may include a non-weldable workpiece 202 that may have different dimensions and/or aspect ratio from a weldable workpiece 204. In at least example, the weldable workpiece 204 may be square and the non-weldable workpiece 202 may have a length and a width that have a ratio of 3.0. In other embodiments, the FSW assembly 200 may include a plurality of non-weldable workpieces 202 affixed to the weldable workpiece 204. The assembly centerline 213 may be defined by a line that passes through a centerpoint of at least two of the plurality of non-weldable workpieces 202.

In some embodiments, the assembly centerline 213 may be substantially parallel to the body longitudinal axis 211. In other embodiments, the assembly centerline 213 and body longitudinal axis 211 may be non-parallel, e.g. helical relative to the body longitudinal axis 211, and oriented at an angle relative to one another having upper and to lower values including any of 30°, 35°, 40°, 45°, 50°, 55°, 60°, 65°, 70°, 75°, 80°, 85°, less than 90°, or any value therebetween. For example, the assembly centerline 213 and body longitudinal axis 211 may be oriented at an angle relative to one another between 40° and 65°. In another example, the assembly centerline 213 and body longitudinal axis 211 may be oriented at an angle relative to one another between 80° and less than 90°. In yet another example, the assembly centerline 213 and body longitudinal axis 211 may be oriented at an angle relative to one another of 60°. The FSW assembly 200 can be raised up to three times a diameter of the downhole tool 210. In other embodiments, the FSW assembly 200 can be raised an amount in a range having values including any of 0.5, 1.0, 1.5, 2.0, 2.5, 3.0, or any value therebetween times the diameter of the downhole tool 210. For example, the FSW assembly 200 can be raised an amount between 0.5 and 2.0 times the diameter of the downhole tool 210. In other examples, the FSW assembly 200 can be raised an amount between 1.0 and 1.5 times the diameter of the downhole tool 210.

The FSW assembly 200 may also vary in thickness. For example, the FSW assembly 200 may be tapered at at least one edge of the FSW assembly 200. In some embodiments, the thickness of the weldable workpiece 204 may be varied and/or the thickness of the non-weldable workpiece 202 may be varied. The thickness of the weldable workpiece 204 may be greatest in a center of the weldable workpiece 204. In other examples, the thickness of the weldable workpiece 204 may be greatest at an edge and may have a taper to an opposing edge (e.g., a ramp-like structure). In yet other examples, the thickness of the non-weldable workpiece 202 may be greatest in a center of the non-weldable workpiece 202. In other examples, the thickness of the non-weldable workpiece 202 may be greatest at an edge and may have a taper to an opposing edge (e.g., a ramp-like structure). In yet further examples, the thickness of the non-weldable workpiece 202 and/or weldable workpiece 204 may be constant across the area of the FSW assembly 200.

The width of the FSW assembly 200 could be about ⅛ to ¼ of the circumference of the downhole tool. The circumference of the downhole tool 210 may include one or more FSW assemblies 200 that account for a portion of the circumference of the downhole tool. In some embodiments, the downhole tool 210 may include one or more FSW assemblies 200 that may account for 25%, 30%, 35%, 40%, 45%, 50%, 55%, 60%, 65%, 70%, 75%, 80%, 85%, 90%, 95%, or 100% of the circumference of the downhole tool 210. For example, the one or more FSW assemblies 200 may count for between 30% and 90% of the circumference of the downhole tool 210. In other examples, the one or more FSW assemblies 200 may count for between 40% and 80% of the circumference of the downhole tool 210. In yet other examples, the one or more FSW assemblies 200 may count for between 45% and 65% of the circumference of the downhole tool 210.

Figure 3:
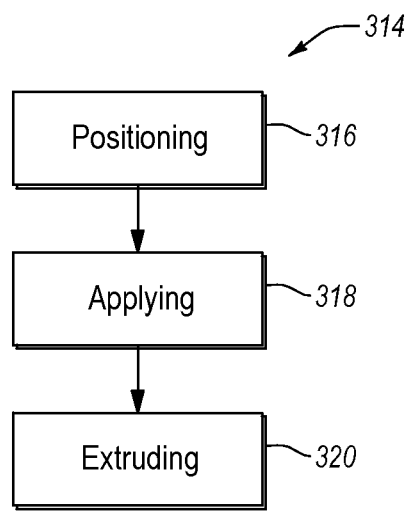
FIG. 3 is a chart of a method for joining a non-weldable material and a weldable material, in accordance with at least one embodiment described herein.

A method 314 for joining a non-weldable workpiece to a weldable workpiece is shown in FIG. 3. The method 314 may include positioning 316 a non-weldable workpiece adjacent a weldable workpiece and applying 318 force and heat to the weldable workpiece to plasticize and mobilize at least a portion of weldable workpiece. In some embodiments, the heat applied to the weldable workpiece may be or include heat generated by friction between a FSW tool and the weldable workpiece. In other embodiments, the heat applied to the weldable workpiece may be or include heat generated by an external heater, such as a laser, torch, or other heat source. Applying 318 force and heat to the weldable workpiece may assist in extruding 320 at least a portion of the weldable workpiece into a recess in the non-weldable workpiece to mechanically lock the weldable workpiece to the non-weldable workpiece and form an FSW assembly.

Figure 4:
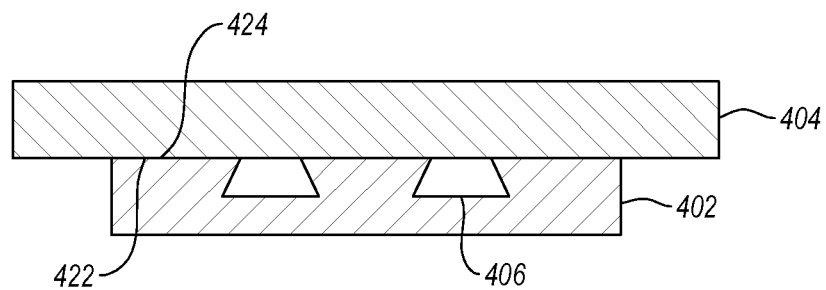
FIG. 4 is a schematic cross-sectional side view of a first workpiece positioned adjacent a second workpiece having recesses therein, in accordance with at least one embodiment described herein.
Figure 5:
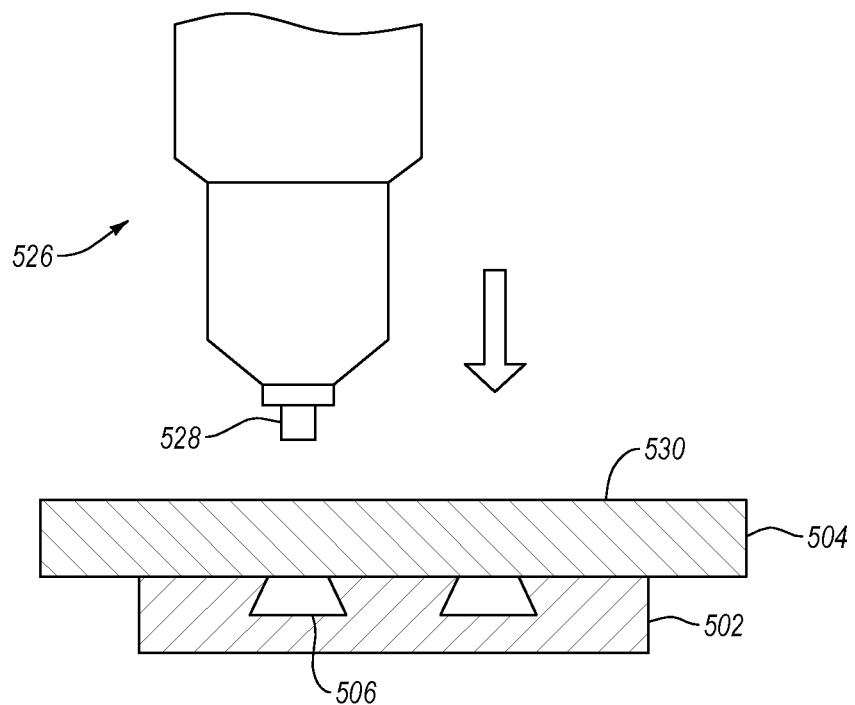
FIG. 5 is a schematic cross-sectional side view of FSW tool applied to a surface of a workpiece of a weldable material, in accordance with at least one embodiment described herein.

FIG. 4 depicts another embodiment of a non-weldable workpiece 402 positioned adjacent a weldable workpiece 404. The non-weldable workpiece 402 may contact the weldable workpiece 404 along a connection surface 422 of the non-weldable workpiece 402 having one or more recesses 406 therein. The connection surface 422 of the non-weldable workpiece 402 may abut an extrusion surface 424 of the weldable workpiece 404. FIG. 5 depicts a schematic representation of a FSW tool 526 having a FSW tip 528 adjacent a welding surface 530 of a weldable workpiece 504. The FSW tool 526 may be able to rotate the FSW tip 528 at sufficient speed and while applying surface force to the FSW tip 528 to plunge the FSW tip 528 into the weldable workpiece 504. In some embodiments, the weldable workpiece may be made of or include a high melting temperature metal alloy and the FSW tool may rotate the FSW tip 528 at a rate in a range having upper and lower values including 50 revolutions per minute ("RPM"), 100 RPM, 150 RPM, 200 RPM, 250 RPM, 300 RPM, 350 RPM, 400 RPM, 450 RPM, 500 RPM, 600 RPM, 700 RPM, 800 RPM, 900 RPM, 1000 RPM, or any value therebetween. In other embodiments, the FSW tool may apply a force to the weldable workpiece in a range having upper and lower values including 4 kilonewtons ("kN"), 6 kN, 8 kN, 10 kN, 20 kN, 30 kN, 40 kN, 50 kN, 60 kN, 70 kN, 80 kN, 90 kN, 100 kN, or any value therebetween.

In at least one embodiment, the weldable workpiece 504 may be made of or include tool steel. In some embodiments, the FSW tool 526 may be positioned adjacent the welding surface 530 and aligned with a recess 506 in a non-weldable workpiece 502. As used herein, "aligned with" should be understood to include positioned adjacent a point on the welding surface 530 nearest the recess 506 (as shown in FIG. 5), as well as positioned adjacent a point on the welding surface 530 such that an axis of rotation of the FSW tool 526 and/or FSW tip 528 may intersect at least part of a recess 506 in the non-weldable workpiece 502. For example, a FSW tool 526 may be positioned at an angle with the welding surface 530 that is less than 90° (e.g., a 45° angle). The FSW tool 526 may be moved relative to the welding surface 530 such that the FSW tool 526 may apply a force to the welding surface 530 that is coaxial with the axis of rotation of the FSW tool 526 and/or FSW tip 528. A path of movement of the FSW tool 526 may thereby urge the plasticized portion of the weldable workpiece 504 toward the recess 506 in the non-weldable workpiece 502.

Figure 6:
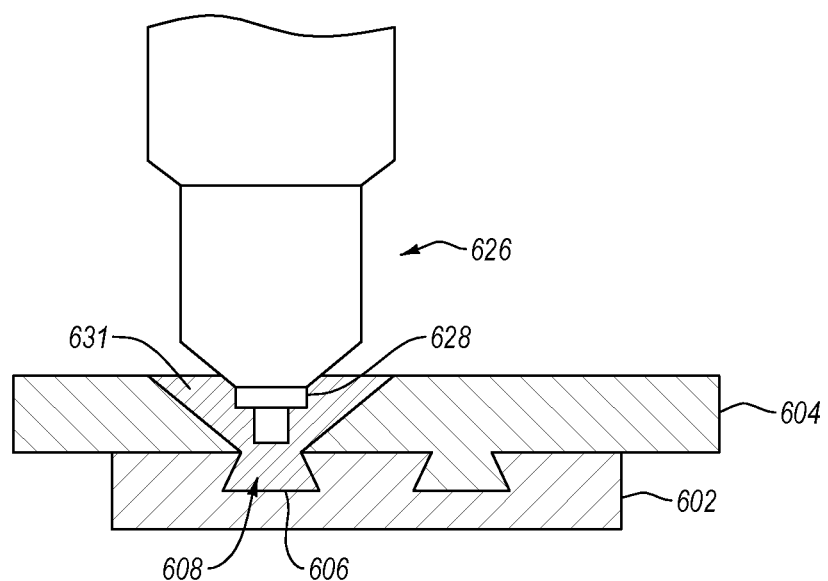
FIG. 6 is a schematic cross-sectional side view of a plasticized region of a first workpiece extruded into a recess of a second workpiece, in accordance with at least one embodiment described herein.

FIG. 6 depicts an embodiment of a non-weldable workpiece 602 and a weldable workpiece 604 joined by an extrusion 608 that is at least partially located in the recess 606. The extrusion may be extruded from the weldable workpiece 604 by a FSW tip 628 plunged into the weldable workpiece 604 by a FSW tool 626. Heat and force applied by the FSW tool 626 to the weldable workpiece 604 may create a friction stirred zone 631. The friction stirred zone 631 may exhibit an altered microstructure relative to the original microstructure of the weldable workpiece 604. The friction stirred zone 631 may exhibit an unaltered chemical composition relative to the original chemical composition of the weldable workpiece 604.

Figure 7:
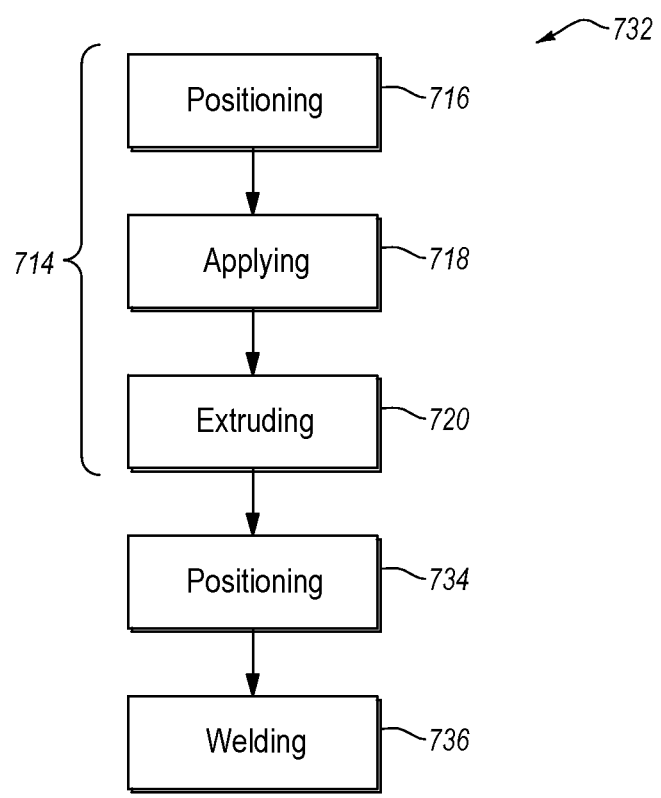
FIG. 7 is a chart of a method for joining a non-weldable material to a weldable material to be affixed to a body, in accordance with at least one embodiment described herein.

After joining a weldable workpiece to a non-weldable workpiece by extrusion of a friction stirred zone of the weldable workpiece to form a FSW assembly, the assembly may be welded to another body using any appropriate welding technique. As shown in FIG. 7, a method 732 for joining a non-weldable workpiece to an outer surface of a main body may include at least part of a method 714 similar to or the same as the method 314 depicted in FIG. 3. The method 732 may include positioning 716 a non-weldable workpiece adjacent a weldable workpiece and applying 718 a force and heat to the weldable workpiece to plasticize and mobilize at least a portion of weldable workpiece. In some embodiments, the heat applied to the weldable workpiece may be or include heat generated by friction between a FSW tool and the weldable workpiece. In other embodiments, the heat applied to the weldable workpiece may be or include heat generated by an external heater, such as a laser, torch, or other heat source. Applying 718 a force and heat to the weldable workpiece may assist in extruding 720 at least a portion of the weldable workpiece into a recess in the non-weldable workpiece to mechanically lock the weldable workpiece to the non-weldable workpiece and form an FSW assembly.

The method 732 may include positioning 734 the FSW assembly adjacent a body, such as the body of a downhole tool, and welding 736 the FSW assembly to the body. In some embodiments, the method 732 may include positioning 734 a FSW assembly including a carbide non-weldable workpiece and welding 736 the FSW assembly to a body made of or including a high melting temperature metal. In at least one embodiment, the body may be the body of a downhole tool. In at least one other embodiment, the body may be the body of a tubular in a drill string. For example, the FSW assembly may be a wear pad (for example, a stabilizer pad) and may be welded to a component of a bottomhole assembly. For example, the wear pad may be welded to a downhole tool such a tubular, including segmented drill pipe, coiled tubing, drill collars, transition pipe (e.g., HEVI-WATE drill pipe), and drill pipe; or other downhole tools, including a bit, a cutter, bit drive assembly, motor, MWD, LWD, communications module, anchor, stabilizer, underreamer, milling tool, jarring device, and crossovers.

Figure 8:
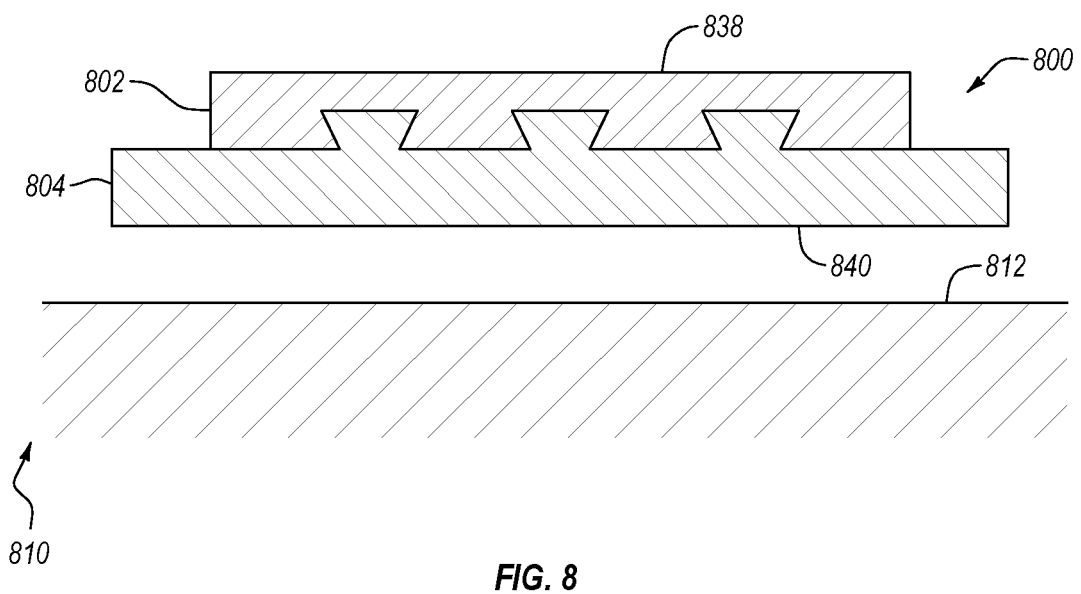
FIG. 8 is a schematic cross-sectional side view of a joined assembly positioned adjacent to a body, in accordance with at least one embodiment described herein.
Figure 9:
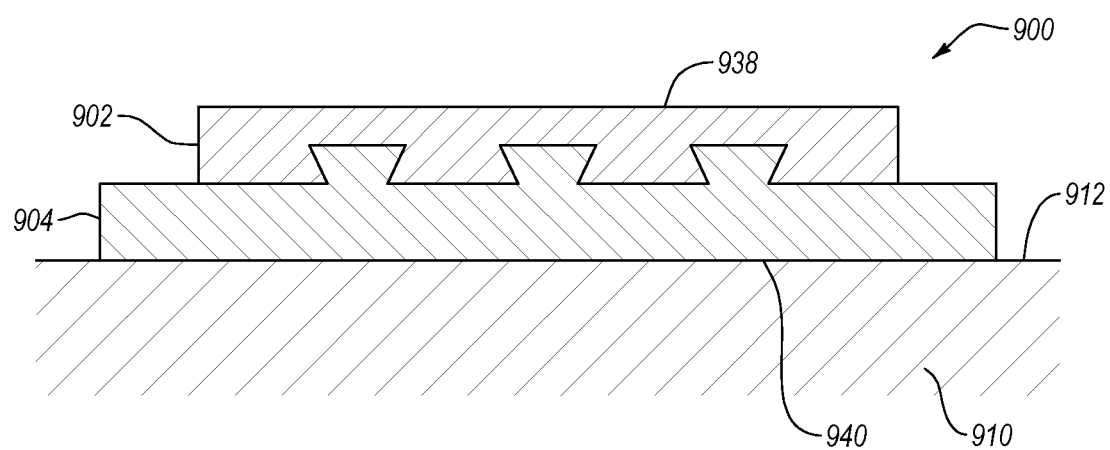
FIG. 9 is a schematic cross-sectional side view of a joined assembly welded to a body, in accordance with at least one embodiment described herein.

FIG. 8 depicts an embodiment of an FSW assembly 800 having a non-weldable workpiece 802 connected to a weldable workpiece 804. The outer surfaces of the FSW assembly 800 may be a wear surface 838 adjacent the non-weldable workpiece 802 and a welding surface 840. The welding surface 840 may be positioned adjacent an outer surface 812 of a body 810. The body 801, as described in relation to FIG. 7, may be the body of a downhole tool. In at least one other embodiment, the body 810 may be the body of a tubular in a drill string. In other embodiments, the body 810 may be or be part of a digging tool on a piece of heavy equipment. In yet further embodiments, the body 810 may be or be part of an asphalt zipper or similar demolition tool. The FSW assembly 900, as shown in FIG. 9, may be welded, brazed, bolted, screwed, locked, otherwise fixed to a body 910 or a combination thereof. The welding surface 940 of the weldable workpiece 904 may be weldable to the outer surface 912 of the body 910. The wear surface 938 of the FSW assembly 900 may be thereby affixed to the outer surface 912 of the body 910 with the weldable workpiece 904 functioning similarly to a substrate. The wear surface 938.

The non-weldable workpiece 902 may be made of or include a material that is harder than the body 910, effectively increasing the wear resistance and/or operational lifetime of the body 910. In some embodiments, the non-weldable workpiece 902 may include tungsten carbide, cubic boron nitride, polycrystalline diamond, boron carbide, boron carbon nitride, other materials having a hardness greater than 40 gigapascals (GPa) when measured by the Vicker's hardness test, or combinations thereof. In such embodiments, the body 910 may include steel, titanium alloys, nickel superalloys, other metal high melting temperature alloys, or combinations thereof. As described earlier, while steel, titanium alloys, nickel superalloys, other metal high melting temperature alloys, or combinations thereof may, in some embodiments, be non-weldable materials when paired with softer materials, such as aluminum. When connected to superhard materials such as tungsten carbide, cubic boron nitride, polycrystalline diamond, boron carbide, boron carbon nitride, other materials having a hardness greater than 40 gigapascals (GPa), metals such as steel, titanium alloys, nickel superalloys, other metal high melting temperature alloys, or combinations thereof may be properly considered weldable materials according to the present disclosure. For example, equipment capable of welding aluminum may be unable to weld a nickel superalloy, and equipment capable of welding a nickel superalloy may be unable to weld tungsten carbide.

Figure 10:
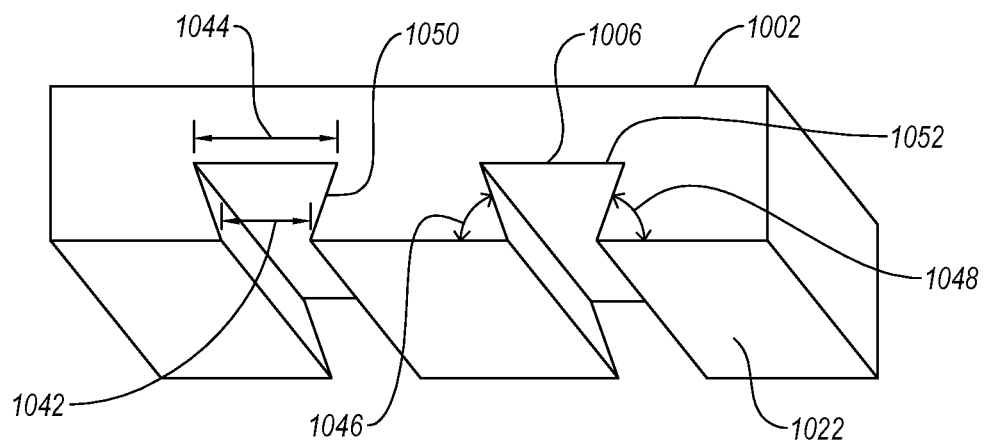
FIG. 10 is a perspective view of a workpiece having recesses therein in accordance with at least one embodiment described herein.

Referring now to FIG. 10, a recess 1006 in a non-weldable workpiece 1002 may be formed in a variety of ways and a variety of geometries. For example, a carbide, such as tungsten carbide may be formed by cold-pressing a powder including tungsten carbide crystals and cobalt with a binding agent. The cold-pressed material is a "green" state, which may be formed to a desired shape. The green state may be relatively soft and allow the material to be manipulated, molded, ground, otherwise machined, or combinations thereof. The non-weldable workpiece 1002 in a green state may be then be subjected to a high temperature sintering process, which may or may not include high pressures. The sintering process may alter the dimensions of the carbide component; for example, reducing the size of the non-weldable workpiece 1002. One or more recesses may be formed in a non-weldable workpiece 1002 during the green state of manufacturing or may be ground into the non-weldable workpiece 1002 after sintering. In a non-weldable workpiece 1002 made of or including a metal, one or more recesses 1006 may be machined in the non-weldable workpiece 1002.

A recess 1006 may have a first width 1042 and a second width 1044. The first width 1042 may be proximate a connection surface 1022 of the non-weldable workpiece 1002. The second width 1044 may be farther from the connection surface 1022 than the first width. The second width 1044 may be greater than the first width 1042, creating a dovetail shape when viewed in cross-section, as shown in FIG. 10. The dovetail shape may allow an extrusion, such as extrusion 608 shown in FIG. 6, to mechanically lock within the recess 1006. At least part of a lateral side 1050 of the recess 1006 between the first width 1042 and the second width 1044 may form a first angle 1046 with the connection surface 1022. In some embodiments, the recess 1006 may have straight sides 1050. In other embodiments, the recess 1006 may have a side 1050 with at least a portion of the side 1050 being curved. The recess 1006 may have a second angle 1048 that opposes the first angle 1046. In some embodiments, the second angle 1048 may be equal to the first angle 1046. In other embodiments, the second angle 1048 may be greater than or less than the first angle 1046.

In some embodiments, the first angle 1046 and/or second angle 1048 may be less than 90°. A first angle 1046 and/or second angle 1048 being less than 90° may allow a first width 1042 that is less than a second width 1044. In other embodiments, the first angle 1046 and/or second angle 1048 may be within a range having upper and lower values including any of 50°, 55°, 60°, 65°, 70°, 75°, 80°, 85°, less than 90°, or any value therebetween. For example, the first angle 1046 and/or second angle 1048 may be between 60° and 85°. In another example, the first angle 1046 and/or second angle 1048 may be 80°. Extruding material from a weldable workpiece may apply a pressure to the sides 1050 of the recess 1006. Lower values for the first angle 1046 and/or second angle 1048 may allow extruded material to apply a force between one or more sides 1050 and a base 1052 of the recess 1006. A force between one or more sides 1050 and the base 1052 of the recess 1006 may weaken the non-weldable workpiece 1002.

Figure 11:
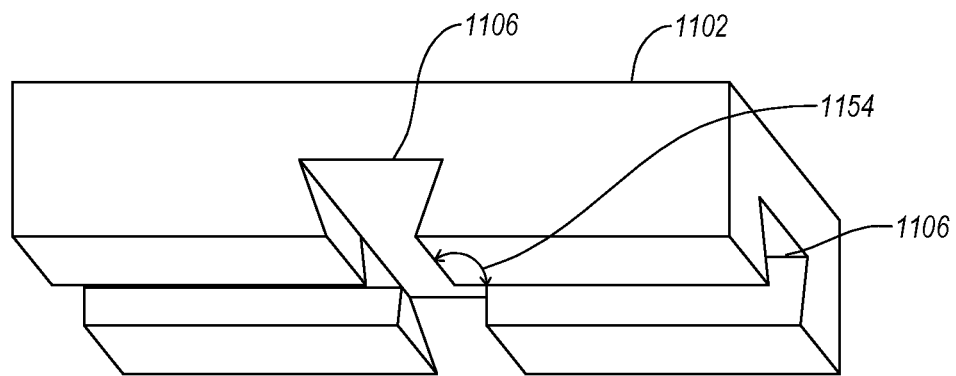
FIG. 11 is a bottom perspective view of a workpiece having intersecting recesses therein, in accordance with at least one embodiment described herein.

One or more recesses 1006 in the non-weldable workpiece 1002 may be substantially straight along the length of the non-weldable workpiece. In other embodiments, a recess 1006 may be curved relative to the length of the non-weldable workpiece. A recess 1006 having a first width 1042 that is smaller than a second width 1044 may limit or, in some cases, prevent movement of weldable workpiece normal to the connection surface 1022. As shown in FIG. 11, one or more recesses 1106 may be oriented at a recess angle 1154 with respect to one another with one another. FIG. 11 depicts a plurality of recesses 1106 intersecting at the recess angle 1154. In other embodiments, a non-weldable workpiece 1102 may have a plurality of non-intersecting recesses 1106 at one or more recess angles 1154.

Figure 12:
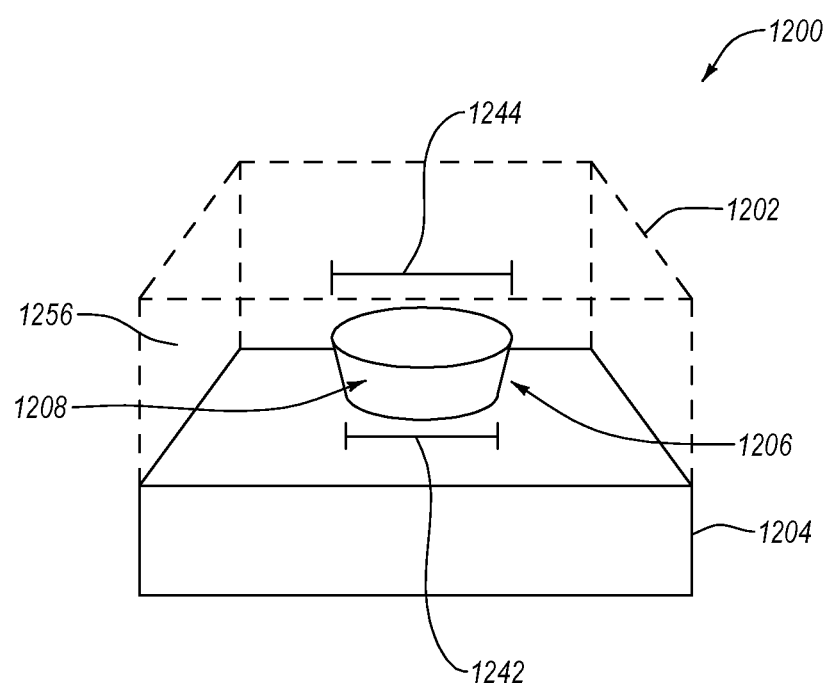
FIG. 12 is a perspective view of a first workpiece having a cylindrical dovetail recess and a second workpiece extruded into the recess, in accordance with at least one embodiment described herein.

FIG. 12 depicts an embodiment of a FSW assembly 1200 including a recess 1206 that is substantially rotationally symmetrical. The recess 1206 may have a dovetail shape similar to that described in relation to FIG. 10. The recess 1206 may have a first width 1242 proximate a weldable workpiece 1204 and a second width 1244 within the non-weldable workpiece 1202. In at least one embodiment, the first width 1242 and second width 1244 may be a first diameter and second diameter. In some embodiments, the recess 1206 may be a closed recess such as a recess 1206 that is round, square, rectangular, elliptical, another regular shape, another irregular shape, or any other shape that does not intersect a lateral side 1256 of the non-weldable workpiece 1206. An extrusion 1208 may be extruded into the closed recess 1206 and mechanically lock the non-weldable workpiece 1206 to a weldable workpiece.

In some embodiments, the weldable workpiece may be an intermediate workpiece that may be configured to be subsequently welded to a body or other surface of a downhole tool. In other embodiments, the weldable workpiece may be part of a body or other surface of a downhole tool and/or the non-weldable workpiece may be part of a body or other surface of a downhole tool. For example, a portion of a weldable first tubular may be positioned concentrically surrounding a portion of a non-weldable second tubular. Part of the weldable first tubular may be plasticized using a FSW tool and extruded into a recess in the non-weldable second member, mechanically joining the first tubular with the second tubular. In another example, a portion of a non-weldable first tubular may be positioned concentrically surrounding a portion of a weldable second tubular. Part of the weldable second tubular may be plasticized using a FSW tool and extruded into a recess in the non-weldable second member, mechanically joining the first tubular with the second tubular.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least to the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A downhole tool comprising:
   a body having an outer surface; and
   a friction stir welded assembly including:
      a non-weldable workpiece having a wear surface and a connection surface on opposing sides of the non-weldable workpiece,
      recesses located in the connection surface extending into the non-weldable workpiece, the recesses each having a first width proximate the connection surface and a second width within the non-weldable workpiece, wherein the first width is smaller than the second width,
      a weldable workpiece having a welding surface and an extrusion surface on opposing sides of the weldable workpiece, wherein at least a portion of the extrusion surface is extruded at least partially into at least one of the recesses to connect the weldable workpiece to the non-weldable workpiece,
   a friction stir weld between at least a portion of the welding surface of the weldable workpiece and the outer surface of the body that fixes the weldable workpiece and non-weldable workpiece connected thereto to the outer surface of the body,
   wherein the recesses include a pair of elongate recesses each having a length; and
   wherein the elongate recesses intersect and the lengths of the elongate recesses extend at a recess angle relative to one another.

2. The downhole tool of claim 1, wherein the non-weldable workpiece comprises a carbide.

3. The downhole tool of claim 1, wherein the recesses include a closed recess.

4. The downhole tool of claim 3, wherein the closed recess is a rotationally symmetrical closed recess.

5. The downhole tool of claim 1, wherein the outer surface of the body is curved.

6. The downhole tool of claim 1, wherein the body is cylindrical and has a body longitudinal axis, the friction stir welded assembly having an assembly centerline transverse to the body longitudinal axis.

7. The downhole tool of claim 1, further comprising a plurality of friction stir welded assemblies.

8. The downhole tool of claim 1, wherein the friction stir welded assembly further comprises a plurality of non-weldable workpieces.

9. The downhole tool of claim 1, wherein the body is configured to connect to a downhole tool or tubular.

10. The downhole tool of claim 1, wherein the body is a tubular.

11. The downhole tool of claim 1, wherein the body includes a material selected from the group consisting of steel, titanium alloy, or nickel superalloy.

12. The downhole tool of claim 1 wherein the non-weldable workpiece has a hardness greater than 40 gigapascals when measured by the Vickers hardness test.

13. A method of affixing a non-weldable workpiece to a weldable workpiece and to an exterior of a downhole tool, the method comprising:
- positioning a weldable workpiece adjacent a non-weldable workpiece, the non-weldable workpiece having recesses therein, the recesses each having a first width adjacent a surface of the non-weldable workpiece and a second width within the non-weldable workpiece, the first width being smaller than the second width;
- applying a force to the weldable workpiece by friction stirring the weldable workpiece;
- extruding at least a portion of the weldable workpiece into at least one of the recesses to connect the weldable workpiece and the non-weldable workpiece;
- positioning the weldable workpiece adjacent an outer surface of a body of the downhole tool; and
- friction stir welding a portion of the weldable workpiece and a portion of the outer surface of the downhole tool body to affix the weldable workpiece to the exterior of the downhole tool;
- wherein the recesses include a pair of elongate recesses each having a length; and
- wherein the elongate recesses intersect and the lengths of the elongate recesses extend at a recess angle relative to one another.

14. The method of claim 13, wherein the at least one of the recesses is a dovetail.

15. The method of claim 13, wherein the is recesses include a rotationally symmetrical dovetail.

16. The method of claim 13, wherein the non-weldable workpiece has a curved surface.

17. The method of claim 13, wherein the outer surface includes a material selected from the group consisting of steel, titanium alloy, or nickel superalloy.

18. The method of claim 13, wherein the non-weldable workpiece is a carbide.

19. The method of claim 13, wherein positioning the weldable workpiece further comprises orienting an assembly centerline at an angle with a body longitudinal axis.

20. A downhole tool apparatus comprising:
- a downhole tool body having an outer surface;
- a non-weldable workpiece having a wear surface and a connection surface on opposing sides of the non-weldable workpiece;
- recesses located in the connection surface extending into the non-weldable workpiece, the recesses each having a first width proximate the connection surface and a second width within the non-weldable workpiece, the first width being smaller than the second width;
- a weldable workpiece having a welding surface and an extrusion surface on opposing sides of the weldable workpiece, wherein at least a portion of the extrusion surface is extruded at least partially into at least one of the recesses to connect the weldable workpiece to the non-weldable workpiece; and
- a friction stir weld between at least a portion of the welding surface of the weldable workpiece and the outer surface of the downhole tool body that fixes the weldable workpiece and the non-weldable workpiece connected thereto to the outer surface of the downhole tool body;
- wherein the recesses include a pair of elongate recesses each having a length; and
- wherein the elongate recesses intersect and the lengths of the elongate recesses extend at a recess angle relative to one another.

\* \* \* \* \*